June 29, 1954     H. S. ORR     2,682,333

ROLLER CONVEYER

Filed Nov. 23, 1951

INVENTOR.
HOWARD S. ORR
BY
Donald G. Dalton
HIS ATTORNEY

Patented June 29, 1954

2,682,333

UNITED STATES PATENT OFFICE 2,682,333

ROLLER CONVEYER

Howard S. Orr, Pittsburgh, Pa., assignor to United States Steel Corporation, a corporation of New Jersey Application November 23, 1951, Serial No. 257,822

7 Claims. (Cl. 198—127)

This invention relates to roller conveyors and more particularly to conveyors for transporting objects whose weight rests on the rolls in the boundary region of the object, such as channels supported on their flanges rather than on the webs, inverted tubs, circular rings and metal containers. Such conveyors may be power driven or the gravity type. In roller conveyors generally used there is a tendency for the objects being conveyed to creep off center as they travel over the rollers. To prevent objects from dropping off the sides of the conveyor side guides are utilized and contact between the objects and the guide may result in jamming the conveyor system and damage to the object.

These disadvantages have been overcome in conveying objects resting on a relatively flat side by the conveyor disclosed in the copending application to Lorig, Serial No. 183,549, filed September 7, 1950 and now Patent No. 2,622,720. The conveyor disclosed therein will act to center and align objects conveyed on a flat side, but is not suitable for conveying objects of the type mentioned above in which the bearing pressure on the rollers is confined to the outer boundaries of the objects.

It is an object of my invention to provide a roller conveyor which will align objects supported on their outer boundaries at or adjacent the center line of the conveyor.

This and other objects will be more apparent after referring to the following specification and attached drawings, in which.

Figure 1:
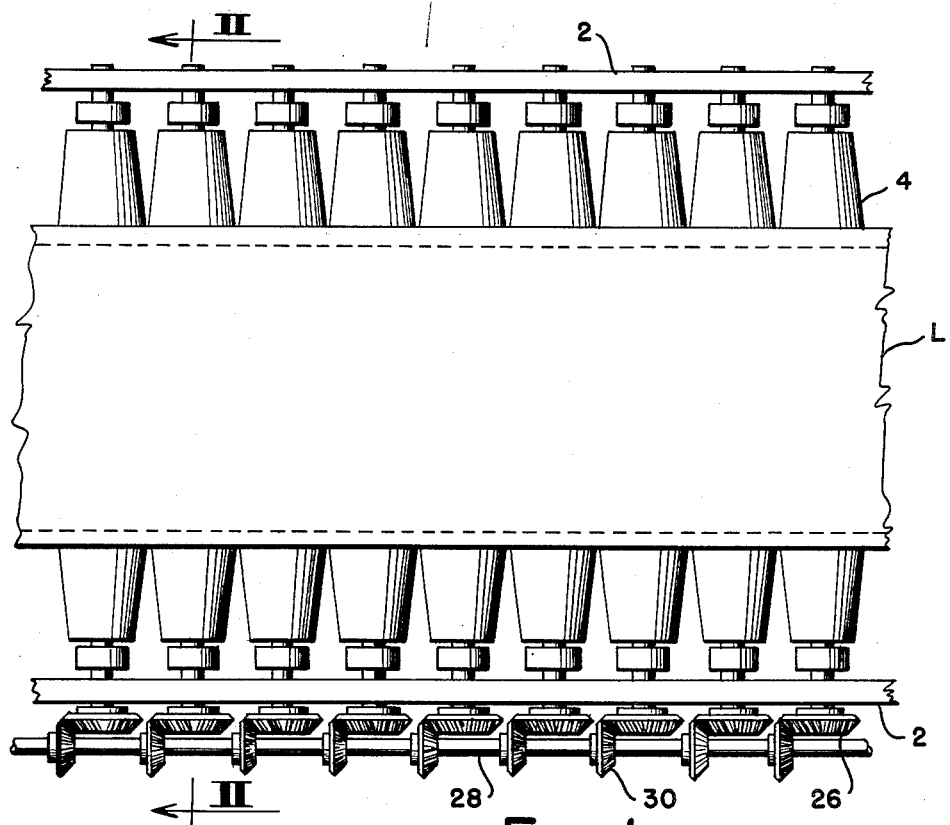
Figure 1 is a top plan view of the roller conveyor of my invention.
Figure 2:
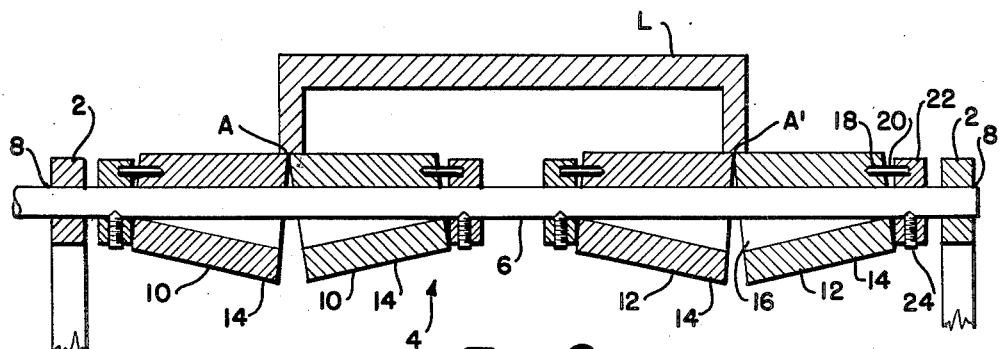
Figure 2 is a sectional view taken on the line II—II of Figure 1.

Referring more particularly to the drawings, the reference numeral 2 indicates the framework for supporting the rollers of a conveyor. Each roller 4 of the conveyor is made up of a shaft 6 mounted in bearings 8 supported in the framework 2 and two pair of rolls 10, 10 and 12, 12. The rolls 10 and 12 are preferably identical and each roll consists of a rim portion 14 having an opening 16 therethrough. The rim portion 14 and opening 16 are preferably frusto-conical with the large diameter portions of each pair adjacent one another. The conical effect shown in the drawings is greatly exaggerated for the purpose of illustration. The small diameter end of each roll is provided with an opening 18 for receiving a drive pin 20 having a diameter somewhat smaller than the diameter of the opening 18. The pin 20 is supported by a collar 22 which is held in adjusted position on the shaft 6 by means of a set screw 24. It will be seen that the rolls mounted on each shaft 6 will all rotate at the same angular velocity. A beveled gear 26 is mounted on one end of each of the shafts 6. The gears 26 are driven from a drive shaft 28 through beveled gears 30 mounted on the shaft 28.

Each pair of rolls 10, 10 and 12, 12 functions in the same manner as the rolls shown in the copending application to Lorig, Serial No. 145,648, filed February 23, 1950 and now Patent No. 2,593,158. In other words, the rotating rims of each pair of rolls are free to deflect and move toward each other and toward their normal geometric axes progressively adjacent the initial point of contact with the moving object. Other rolls disclosed in this copending application may be substituted for the rolls 10 and 12. The load L is shown as an inverted channel with the distance between the center lines of the flanges being equal to the distance between points A—A'. One-half of the weight of the channel is transferred to the left hand pair of rolls 10, 10 and the other half to the right hand pair of rolls 12, 12. Any lateral movement of the channel with respect to the center line of the roll assembly will cause two restoring forces to take place which will bring the center of the flanges back to points A and A' respectively. The restoring takes place rapidly because the two principal restoring forces are in the same direction. For best results it is necessary that the distance between contact surfaces of the load L be equal to the distance A—A' and for this reason at least one pair of rolls should be adjustably mounted on the shaft 6 as shown. However, the rolls will act to center the objects even if the distance between contact points varies somewhat from the distance A—A'. While two pair of rolls are shown mounted on a common shaft 6 any number of such pairs may be mounted on one shaft depending upon the number of spaced apart contact points of the object being conveyed. The device may also be used to convey parallel strands of material through a processing line, there being a pair of rolls for each strand of material. This arrangement will keep the strands parallel and separate at all times.

While one embodiment of my invention has been shown and described, it will be apparent that other adaptations and modifications may be made without departing from the scope of the following claims.

I claim:

1. Apparatus for automatically centering moving objects comprising a shaft, two pairs of spaced apart rolls mounted on said shaft, a rotatable rim on each of said rolls, means for causing the rolls to rotate in synchronism, the rotating rims of the rolls in each pair being free to deflect and move toward each other and toward their normal geometric axes progressively adjacent the initial point of contact with the moving objects.

2. Apparatus for automatically centering moving objects according to claim 1 in which the rolls are frusto-conical with the large diameter ends of the rolls in each pair being adjacent each other.

3. Apparatus for automatically centering moving objects according to claim 1 in which the rolls of one pair are adjustable axially on the shaft with respect to the rolls of the other pair.

4. A conveyor for automatically centering moving objects comprising a plurality of rollers arranged transversely of the path of movement of said objects, each of said rollers including a shaft, two pairs of spaced apart rolls mounted on said shaft, a rotatable rim on each of said rolls, means for causing the rolls to rotate in synchronism, the rotating rims of the rolls in each pair being free to deflect and move toward each other and toward their normal geometric axes progressively adjacent the initial point of contact with the moving objects.

5. A conveyor for automatically centering moving objects according to claim 4 in which the rolls are frusto-conical with the large diameter ends of the rolls in each pair being adjacent each other.

6. A conveyor for automatically centering moving objects according to claim 4 in which the rolls of one pair on each shaft are adjustable axially on the shaft with respect to the rolls of the other pair.

7. Apparatus for automatically centering moving objects comprising two pairs of spaced apart rolls, a rotatable rim on each of said rolls, means for mounting said rolls in substantial axial alignment, means for causing the rolls to rotate in synchronism, the rotating rims of the rolls in each pair being free to deflect and move toward each other and toward their normal geometric axes progressively adjacent the initial point of contact with the moving objects.

References Cited in the file of this patent

UNITED STATES PATENTS

| Number | Name | Date |
|---|---|---|
| 1,795,137 | Nye | Mar. 3, 1931 |
| 2,217,075 | O'Malley | Oct. 8, 1940 |
| 2,262,325 | Kendall | Nov. 11, 1941 |